(12) United States Patent
Gibson et al.

(10) Patent No.: US 7,494,946 B2
(45) Date of Patent: Feb. 24, 2009

(54) THERMAL INSULATION FOR ARTICLES OF CLOTHING

(75) Inventors: Phillip W. Gibson, Holliston, MA (US); Calvin K. Lee, Needham, MA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 758 days.

(21) Appl. No.: 11/242,266

(22) Filed: Oct. 3, 2005

(65) Prior Publication Data

US 2007/0077842 A1 Apr. 5, 2007

(51) Int. Cl.
*D04H 1/00* (2006.01)
*B32B 5/18* (2006.01)
(52) U.S. Cl. ............... 442/354; 442/341; 442/373; 442/189

(58) Field of Classification Search ............... 442/341, 442/340, 376–377, 346, 228, 189, 414; 428/220
See application file for complete search history.

(56) References Cited

U.S. PATENT DOCUMENTS

| | | |
|---|---|---|
| 4,167,604 A | 9/1979 | Aldrich |
| 4,460,645 A | 7/1984 | Jones et al. |
| 4,537,822 A | 8/1985 | Nanri et al. |
| 4,550,046 A | 10/1985 | Miller |
| 6,077,597 A | 6/2000 | Pause |
| 6,382,526 B1 | 5/2002 | Reneker et al. |
| 6,520,425 B1 | 2/2003 | Reneker |
| 2003/0041364 A1 * | 3/2003 | Donaldson ............... 2/69 |

* cited by examiner

*Primary Examiner*—Lynda Salvatore
(74) *Attorney, Agent, or Firm*—Vincent J. Ranucci

(57) ABSTRACT

A thermal insulation material for articles of clothing, the material including fibers for providing thermal insulation and fibers for providing a stable structure for the material.

36 Claims, 2 Drawing Sheets

THERMAL INSULATION FOR ARTICLES OF CLOTHING

STATEMENT OF GOVERNMENT INTEREST

The invention described herein may be manufactured and used by the U.S. Government for governmental purposes without the payment of any royalty thereon.

BACKGROUND OF THE INVENTION

1. Field of the Invention

The invention relates to thermal insulation materials and is directed more particularly to such materials for articles of clothing, including wear for soldiers, sailors, outdoorsmen, and the like.

2. Description of the Prior Art

It is known to provide materials having insulative qualities which preserve body heat of a wearer so as to provide an increased degree of comfort to a wearer in a cold weather setting. Materials having beneficial thermal insulation qualities often are bulky and not structurally stable, so that combinations of different materials are required to provide both conservation of body heat and a stable low bulk structure.

In U.S. Pat. No. 4,167,604, issued Sep. 11, 1979 to William E. Aldrich, a blend of two materials is proposed, including goose down or duckdown for warmth.

In U.S. Pat. No. 4,460,645 issued Jul. 17, 1984 to John C. Jones et al, it is suggested that metal coatings on fibers can provide good heat reflective properties. Suggested coating thickness is in the one micron range.

U.S. Pat. No. 4,537,822, issued Aug. 27, 1985 to Shosuke Nanri et al; U.S. Pat. No. 4,550,046, issued Oct. 29, 1985 to Stephen P. Miller; and U.S. Pat. No. 6,077,597, issued Jun. 20, 2000 to Barbara Pause, all relate to various combinations of layers of diverse materials to provide thermal insulation.

In U.S. Pat. No. 6,382,526, issued May 7, 2002 to Darrell H. Renecker et al and U.S. Pat. 6,520,425, issued Feb. 18, 2003 to Darrell H. Renecker, there is discussed a process and apparatus for providing nanofibers having diameters of one micron and less. Such fibers have been found to be beneficial as refractive or reflective materials for thermally insulating a wearer. However, inasmuch as nanofibers have very small diameters (one micron or less) and provide low bulk, when used in clothing they do not provide a stable or structurally sound material.

Accordingly, there is a need for an insulative material suitable for human wear and having the thermal characteristics required for conserving body heat in very cold surroundings, but also having a strong, stable and low bulk structure. Low bulk is a highly desireable feature for insulation battings. Efficient and low bulk cold weather clothing is particularly important for soldiers in the battlefield. Light weight and low bulk clothing systems greatly improve the mobility and readiness of soldiers. On the commercial side, light weight and low bulk cold weather systems are desirable for outdoor activities and sports.

SUMMARY OF THE INVENTION

An object of the invention is, therefore, to provide a thermally insulative material suitable for use in clothing and exhibiting the required thermal insulative qualities and also exhibiting a strong, stable and low bulk structure.

With the above and other objects in view, a feature of the invention is the provision of a thermal insulation material for articles of clothing, the insulation material including a first layer of fabric material for disposition adjacent the body of a wearer, a second layer of material adjacent to the first layer of material, the second layer of material comprising electrically conductive nanofibers, a third layer of material adjacent to the second layer of material, the third layer of material comprising regular fibers having diameters of greater than one micron, and a fourth layer of fabric material adjacent the third layer of material, wherein the second layer of material, when subject to radiated heat from the body of the wearer, refracts a major portion of the radiated heat back to the body of the wearer, and wherein the third layer of material provides structural strength to the insulation material.

In accordance with a further feature of the invention, there is provided a thermal insulation material for articles of clothing, the insulation material including a first layer of fabric material for disposition adjacent the body of a wearer, a second layer of material adjacent to the first layer of material, the second layer of material comprising electrically conductive nanofibers and regular fibers having diameters of greater than one micron, the nanofibers and regular fibers being mixed together, and a third layer of fabric material adjacent the second layer of material, wherein the second layer of material, when subject to radiated heat from the body, refracts a major portion of the radiated heat back to the body of the wearer, and provides structural strength to the insulation material.

In accordance with a still further feature of the invention, there is provided a thermal insulation material for articles of clothing, the insulation material including a first layer of fabric material for disposition adjacent the body of a wearer, a second layer of material adjacent to the first layer of material, the second layer of material comprising reflective nanofibers, a third layer of material adjacent to the second layer of material, the third layer of material comprising regular fibers having diameters of greater than one micron, and a fourth layer of fabric material adjacent the third layer of material, wherein the second layer of material, when subject to radiated heat from the body of the wearer, reflects a major portion of the radiated heat back to the body of the wearer, and wherein the third layer of material provides structural strength to the insulation material.

In accordance with a still further feature of the invention, there is provided a thermal insulation material for articles of clothing, the insulation material including a first layer of fabric material for disposition adjacent the body of a wearer, a second layer of material adjacent to the first layer of material, the second layer of material comprising reflective nanofibers and regular fibers having diameters of greater than one micron, the nanofibers and regular fibers being mixed together, and a third layer of fabric material adjacent the second layer of material, wherein the second layer of material, when subject to radiated heat from the body, reflects a major portion of the radiated heat back to the body of the wearer, and provides structural strength to the insulation material.

The above and other features of the invention, including various novel details of construction and combinations of parts, will now be more particularly described with reference to the accompanying drawings and pointed out in the claims. It will be understood that the particular materials embodying the invention are shown by way of illustration only and not as limitations of the invention. The principles and features of this invention may be employed in various and numerous embodiments without departing from the scope of the invention.

BRIEF DESCRIPTION OF THE DRAWINGS

Reference is made to the accompanying drawings in which are shown illustrative embodiments of the invention, from which its novel features and advantages will be apparent.

In the drawings.

DESCRIPTION OF THE PREFERRED EMBODIMENTS

Figure 1:
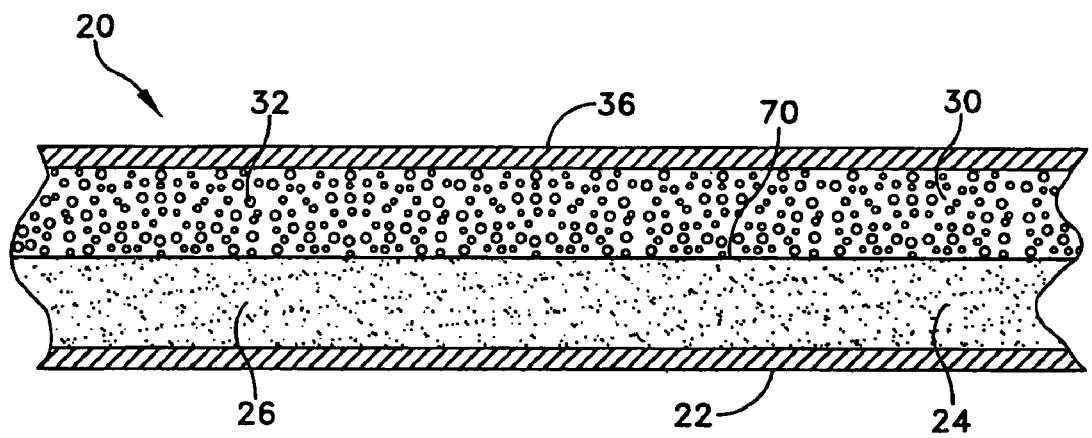
FIG. 1 is a diagrammatic sectional view of a thermally insulative material including four layers of material.

Referring to FIG. 1, it will be seen that an illustrative thermal insulation material 20 includes a first and innermost layer of material 22 for disposition adjacent a body of a wearer (not shown). The first layer may be any material commonly used in articles of clothing, such as cotton, wool, synthetic fiber, and blends thereof. The first layer of material 22 is commonly quite thin, of negligible thickness with respect to bulk and weight.

A second layer of material 24 is disposed adjacent to the first layer 22 and is made up of electrically conductive carbon nanofibers 26 having diameters of no more than one micron. The second layer carbon nanofibers 26 exhibit excellent refraction capabilities. However, because of their small diameters, carbon nanofibers do not support themselves well structurally. The second layer of material 24 is about 0.125 inch thick.

A third layer of material 30 is disposed adjacent to the second layer 24 and is made up of regular fibers 32 of various polymers, such as polyacrylonitrile, polystyrene, polyurethane, polyester, and the like, having diameters of more than one micron. The fibers 32 are of sufficient diameter to provide structural strength to the third layer 30 and to the whole insulation material 20. The third layer of material is about 0.375 inch thick.

A fourth layer 36 is disposed adjacent to the third layer 30 and is usually the outermost layer of the insulation material 20. The fourth layer 36 may be of any material commonly used in clothing materials, such as cotton, wool, synthetics and blends thereof, and may be the same material as the first layer 22, and is very thin. Accordingly, the thickness of the entire insulation material assembly is only very slightly greater than the combined thickness of the second and third layers, i.e., about 0.5 inch±0.15 inch, and the weight of the material 20 is about 4±0.5 lbs/yd$^2$.

In use, as body heat radiates toward the insulation material, most of the radiant heat is refracted back by the second layer 24 to the body. The third layer 30 is positioned outside of the second layer 24 and provides structural strength.

Figure 2:
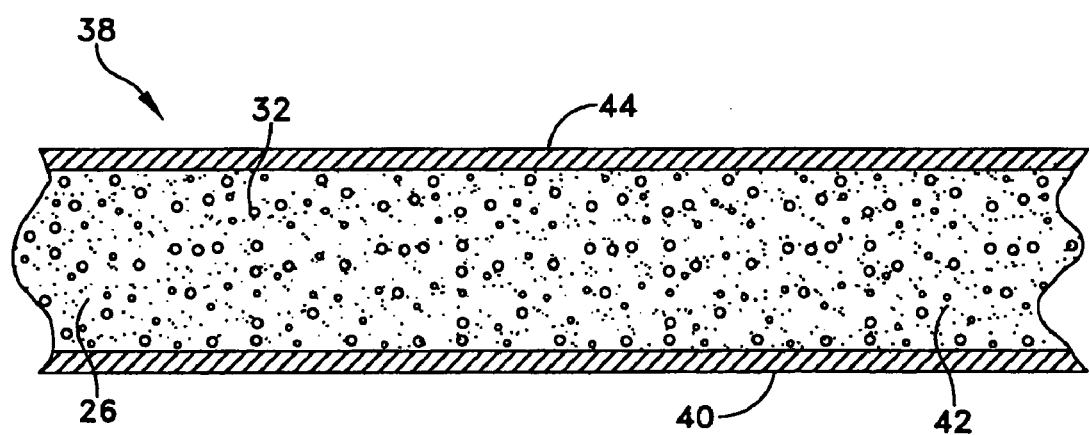
FIG. 2 is a diagrammatic sectional view of a thermally insulative material including three layers of material.

Referring to FIG. 2, it will be seen that in an alternative embodiment 38, an innermost first layer 40 is of a material similar to the material of the first layer 22 of FIG. 1.

A second layer of material 42 is made of a mixture of regular fibers 32 of various polymers, such as polyacrylonitrile, polystyrene, polyurethane, polyester, and the like, and having diameters of greater than one micron and electrically conductive nanofibers 26 having diameters of no more than one micron. Thus, the second layer 42 is made of a mixture of the nanofibers 26 and the regular fibers 32. The mixed layer 42 includes effective refraction properties and strength and stability. The mixed layer includes about 75% regular fibers, by volume, and about 25% nanofibers, by volume. The mixed layer is about 0.5 inch in thickness. The weight of the insulation material is about 4±0.5 lbs/yd$^2$.

A third layer of material 44 is the outermost layer and may be the same, or similar to, the first layer 40.

Figure 3:
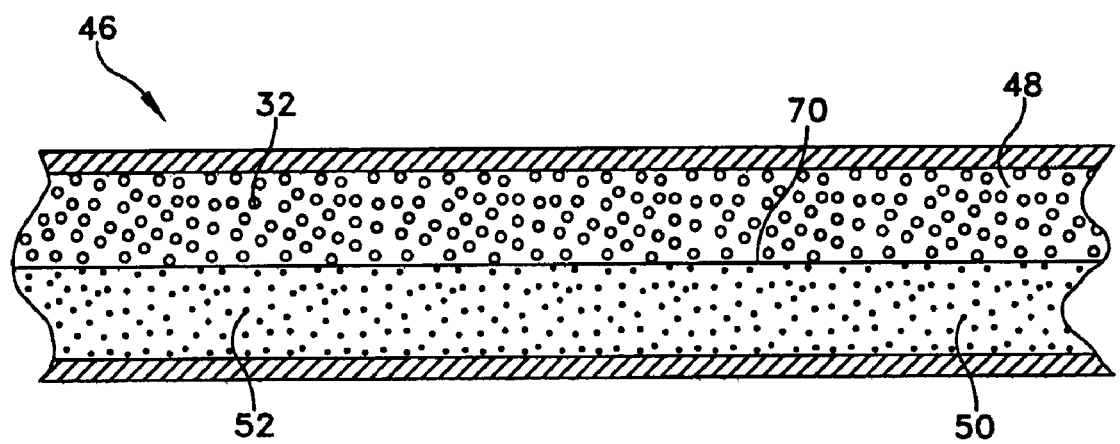
FIG. 3 is similar to FIG. 1, but showing an alternative embodiment of thermally insulative material.

In FIG. 3, there is shown an embodiment 46 similar to that shown in FIG. 1, except that in this instance the nanofiber layer 50 comprises reflective nanofibers 52. The reflective nanofibers 52 may be made of silica, preferably coated with a material, such as aluminum, to provide a highly reflective surface and have diameters of no more than one micron. A second layer 48 is made up of regular fiber 32 having diameters of greater than one micron.

Figure 4:
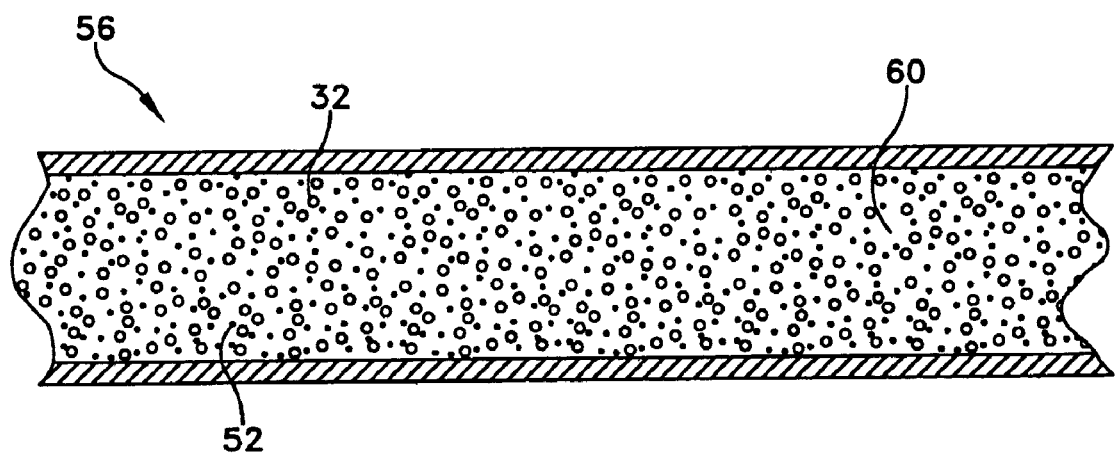
FIG. 4 is similar to FIG. 2, but showing an alternative embodiment of thermally insulative material.

In FIG. 4, there is illustrated an embodiment 56 similar to that shown in FIG. 2, except that in this instance the second layer 60 includes regular fibers 32 having diamters of greater than one micron, and reflective nanofibers 52 having diameters of no more than one micron. The nanofibers are as described with respect to FIG. 3.

The nanofibers 52 of the embodiments of FIGS. 3 and 4 exhibit diameters of no greater than one micron, including the coatings of reflective material.

In the embodiments of FIGS. 3 and 4, radiated body heat is reflected by the reflective nanofibers 52 back toward the body of the wearer, while the regular fibers 32 provide physical stability and strength.

In the FIG. 1 and FIG. 3 embodiments, the second and third layers may be separated by a very thin layer of fabric or synthetic barrier material 70.

The various layers may be attached to each other by adhesive.

In each embodiment, the nanofibers 26, 52 have diameters of no more than one micron, and preferably about 0.05 to 0.5 microns, while the regular fibers 32 have diameters of greater than one micron and preferably about 10 to 30 microns.

The insulation materials 20, 38, 46, and 56 illustrated can be sewn, washed and pressed in the same manner as regular non-insulated clothing. That is, the combinations of layers do not impose special or unique handling in either manufacture or maintenance of clothing.

There are thus provided new and improved thermally insulative materials for wear by people exposed to cold environments, particularly soldiers, sailors, outdoorsmen, and the like. The materials are flexible, of light weight and stable constructions, and easily tailored, washed and pressed.

It is to be understood that the present invention is by no means limited to the particular constructions herein disclosed and/or shown in the drawings, but also comprises any modification or equivalent within the scope of the claims.

What is claimed is:

1. A thermal insulation material for articles of clothing, the insulation material comprising:

a first layer of fabric material for disposition adjacent the body of a wearer;

a second layer of material adjacent to said first layer of material, said second layer of material comprising electrically conductive nanofibers;

a third layer of material adjacent to said second layer of material, said third layer of material comprising regular fibers having diameters of greater than one micron; and a fourth layer of fabric material adjacent said third layer of material;

wherein said second layer of material, when subject to radiated heat from the body of the wearer, refracts a major portion of the radiated heat back to the body of the wearer; and wherein said third layer of material provides structural strength to the insulation material.

2. The thermal insulation material in accordance with claim 1 wherein said conductive nanofibers comprise carbon nanofibers.

3. The thermal insulation material in accordance with claim 2 wherein said carbon nanofibers are provided with diameters of no more than one micron.

4. The thermal insulation material in accordance with claim 3 wherein said carbon nanofibers are provided with diameters of about 0.05 to 0.5 micron.

5. The thermal insulation material in accordance with claim 3 wherein said regular fibers are of a polymer material.

6. The thermal insulation material in accordance with claim 5 wherein said regular fibers are provided with diameters of about 10 to 30 microns.

7. The thermal insulation material in accordance with claim 1 wherein the thermal insulation material is about 0.35 to 0.65 inch in thickness.

8. The thermal insulation material in accordance with claim 7 wherein the thermal insulation material weighs about 3.5 to 4.5 lbs. per square yard.

9. A thermal insulation material for articles of clothing, the insulation material comprising:
    a first layer of fabric material for disposition adjacent the body of a wearer;
    a second layer of material adjacent to said first layer of material, said second layer of material comprising (i) electrically conductive nanofibers, and (ii) regular fibers having diameters of greater than one micron, the nanofibers and regular fibers being mixed together; and
    a third layer of fabric material adjacent said second layer of material;
    wherein said second layer of material, when subject to radiated heat from the body, refracts a major portion of the radiated heat back to the body of the wearer, and provides structural strength to the insulation material.

10. The thermal insulation material in accordance with claim 9 wherein said conductive nanofibers comprise carbon nanofibers.

11. The thermal insulation material in accordance with claim 10 wherein said carbon nanofibers are provided with diameters of no more than one micron.

12. The thermal insulation material in accordance with claim 11 wherein said carbon nanofibers are provided with diameters of about 0.05 to 0.5 micron.

13. The thermal insulation material in accordance with claim 9 wherein said regular fibers are of a polymer material.

14. The thermal insulation material in accordance with claim 13 wherein said regular fibers are provided with diameters of about 10 to 30 microns.

15. The thermal insulation material in accordance with claim 9 wherein the thermal insulation material is about 0.35 to 0.65 inch in thickness.

16. The thermal insulation material in accordance with claim 15 wherein the thermal insulation material weighs about 3.5 to 4.5 lbs. per square foot.

17. The thermal insulation material in accordance with claim 9 wherein said second layer comprises about 75% regular fibers and about 25% nanofibers, by volume.

18. A thermal insulation material for articles of clothing, the insulation material comprising:
    a first layer of fabric material for disposition adjacent the body of a wearer;
    a second layer of material adjacent to said first layer of material, said second layer of material comprising reflective nanofibers;
    a third layer of material adjacent to said second layer of material, said third layer of material comprising regular fibers having diameters of greater than one micron; and
    a fourth layer of fabric material adjacent said third layer of material;
    wherein said second layer of material, when subject to radiated heat from the body of the wearer, reflects a major portion of the radiated heat back to the body of the wearer; and
    wherein said third layer of material provides structural strength to the insulation material.

19. The thermal insulation material in accordance with claim 18 wherein said reflective nanofibers comprise silica coated with a reflective material.

20. The thermal insulation material in accordance with claim 19 wherein the reflective material is aluminum.

21. The thermal insulation material in accordance with claim 19 wherein said nanofibers are provided with diameters of no more than one micron.

22. The thermal insulation material in accordance with claim 21 wherein said nanofibers are provided with diameters of about 0.05 to 0.5 micron.

23. The thermal insulation material in accordance with claim 18 wherein said regular fibers are of a polymer material.

24. The thermal insulation material in accordance with claim 18 wherein said regular fibers are provided with diameters of about 10 to 30 microns.

25. The thermal insulation material in accordance with claim 18 wherein the thermal insulation material is about 0.35 to about 0.65 inch in thickness.

26. The thermal insulation material in accordance with claim 25 wherein the thermal insulation material weighs about 3.5 to 4.5 lbs. per square yard.

27. A thermal insulation material for articles of clothing, the insulation material comprising:
    a first layer of fabric material for disposition adjacent the body of a wearer;
    a second layer of material adjacent to said first layer of material, said second layer of material comprising (i) reflective nanofibers, and (ii) regular fibers having diameters of greater than one micron, the nanofibers and regular fibers being mixed together; and
    a third layer of fabric material adjacent said second layer of material;
    wherein said second layer of material, when subject to radiated heat from the body, reflects a major portion of the radiated heat back to the body of the wearer, and provides structural strength to the insulation material.

28. The thermal insulation material in accordance with claim 27 wherein said reflective nanofibers comprise silica coated with a reflective material.

29. The thermal insulation material in accordance with claim 28 wherein the reflective material is aluminum.

30. The thermal insulation material in accordance with claim 27 wherein said nanofibers are provided with diameters of no more than one micron.

31. The thermal insulation material in accordance with claim 30 wherein said nanofibers are provided with diameters of about 0.05 to 0.5 micron.

32. The thermal insulation material in accordance with claim 27 wherein said regular fibers are of a polymer material.

33. The thermal insulation material in accordance with claim 32 wherein said regular fibers are provided with diameters of about 10 to 30 microns.

34. The thermal insulation material in accordance with claim 27 wherein the thermal insulation material is about 0.35 to about 0.65 inch in thickness.

35. The thermal insulation material in accordance with claim 34 wherein the thermal insulation material weighs about 3.5 to 4.5 lbs. per square yard.

36. The thermal insulation material in accordance with claim 27 wherein said second layer comprises about 75% regular fibers and about 25% nanofibers, by volume.

* * * * *